(No Model.) 6 Sheets—Sheet 1.
F. WICKS.
TYPE MAKING AND ARRANGING MACHINERY.
No. 280,699. Patented July 3, 1883.
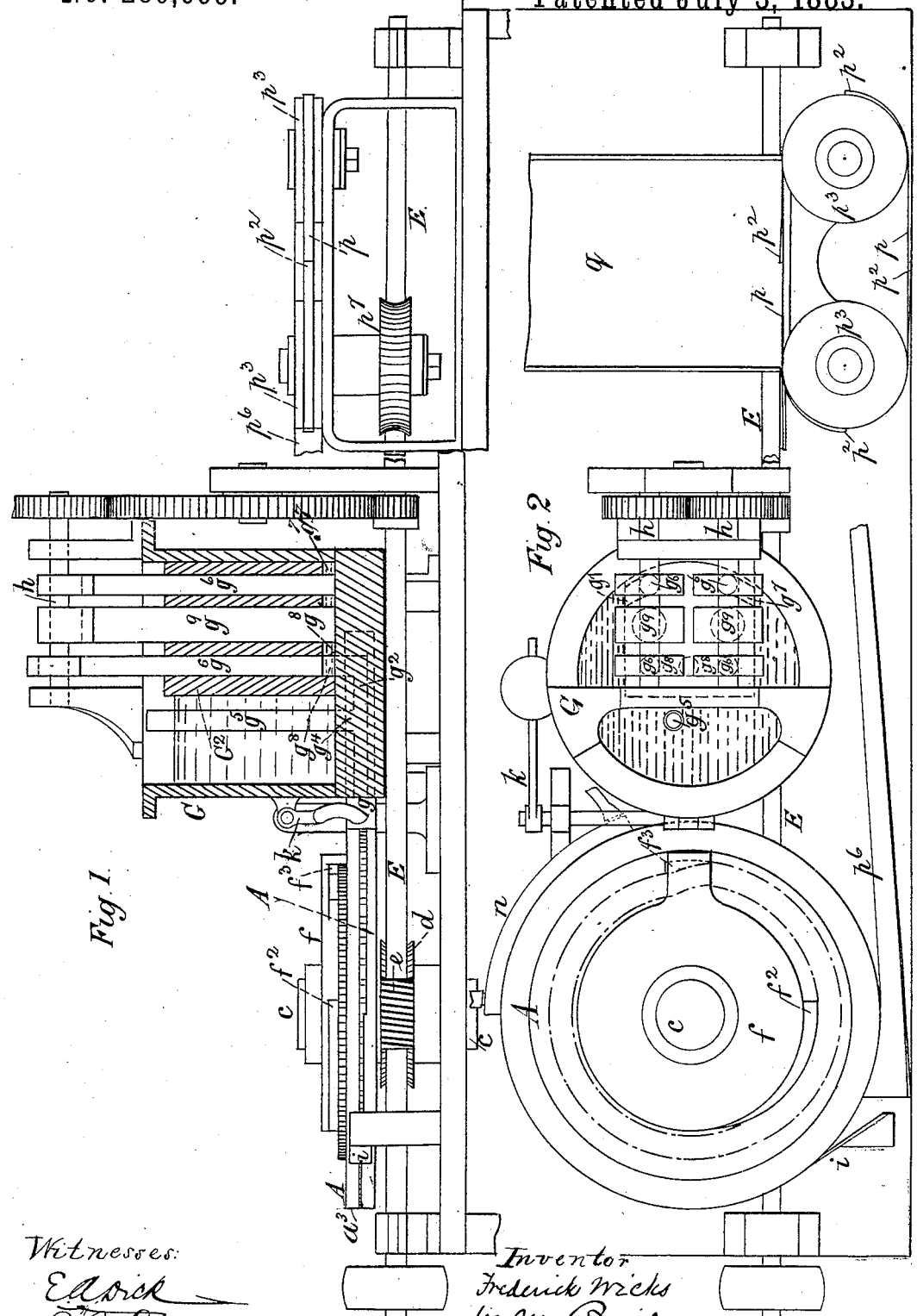

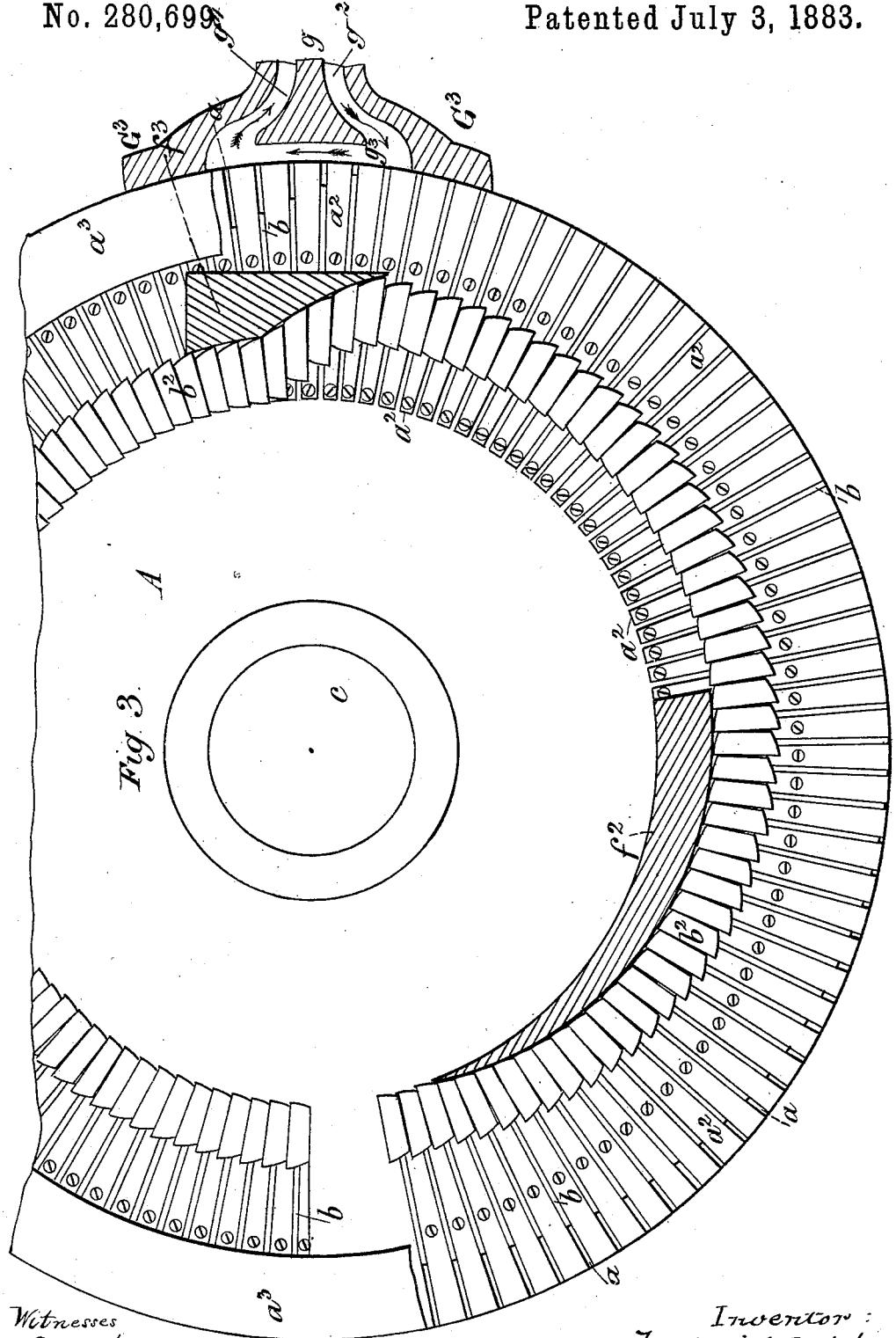

(No Model.) 6 Sheets—Sheet 3.
F. WICKS.
TYPE MAKING AND ARRANGING MACHINERY.
No. 280,699. Patented July 3, 1883.
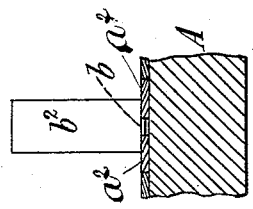
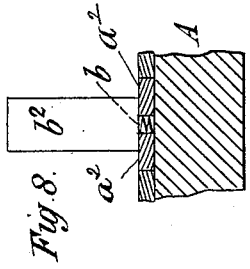
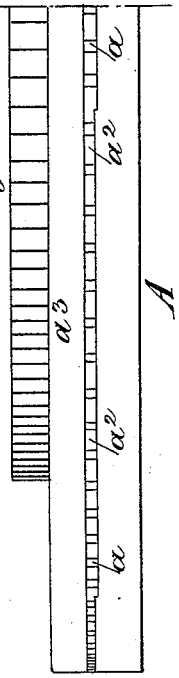
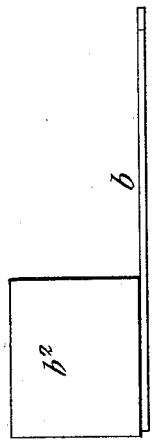
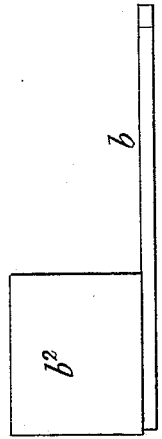
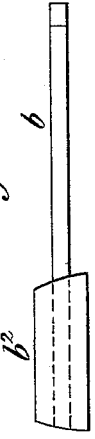
Witnesses:
E. A. Dick
P. W. B. Doing
Inventor:
Frederick Wicks
by W. Bailey
his attorney (No Model.) 6 Sheets—Sheet 4.
F. WICKS.
TYPE MAKING AND ARRANGING MACHINERY.
No. 280,699. Patented July 3, 1883.
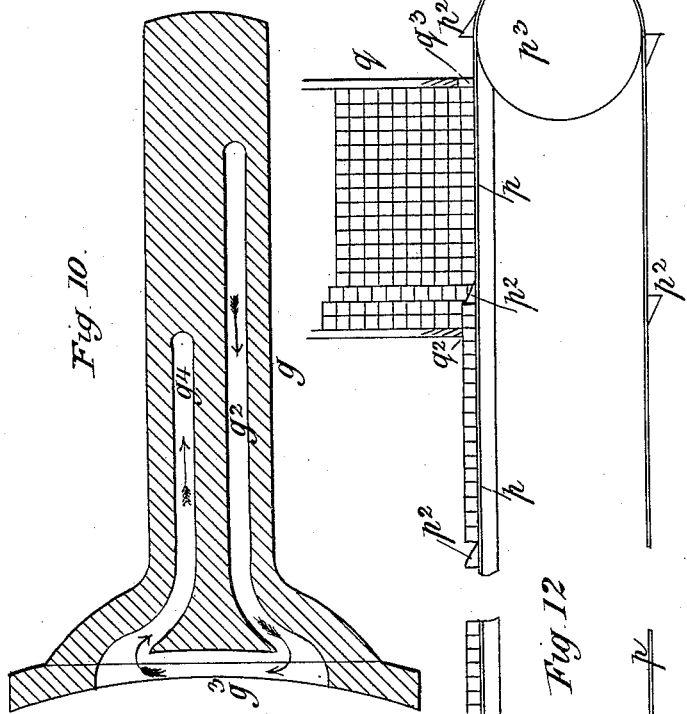
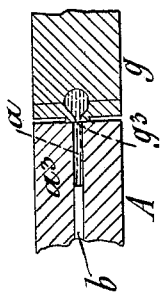
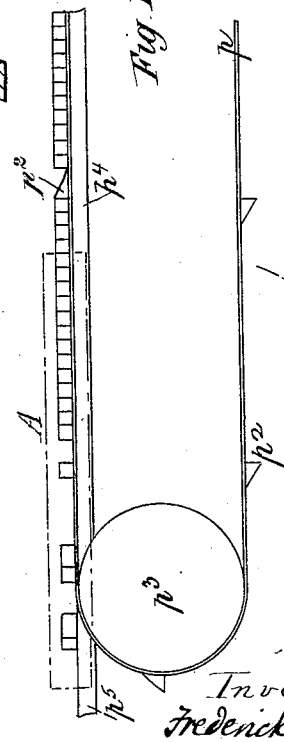
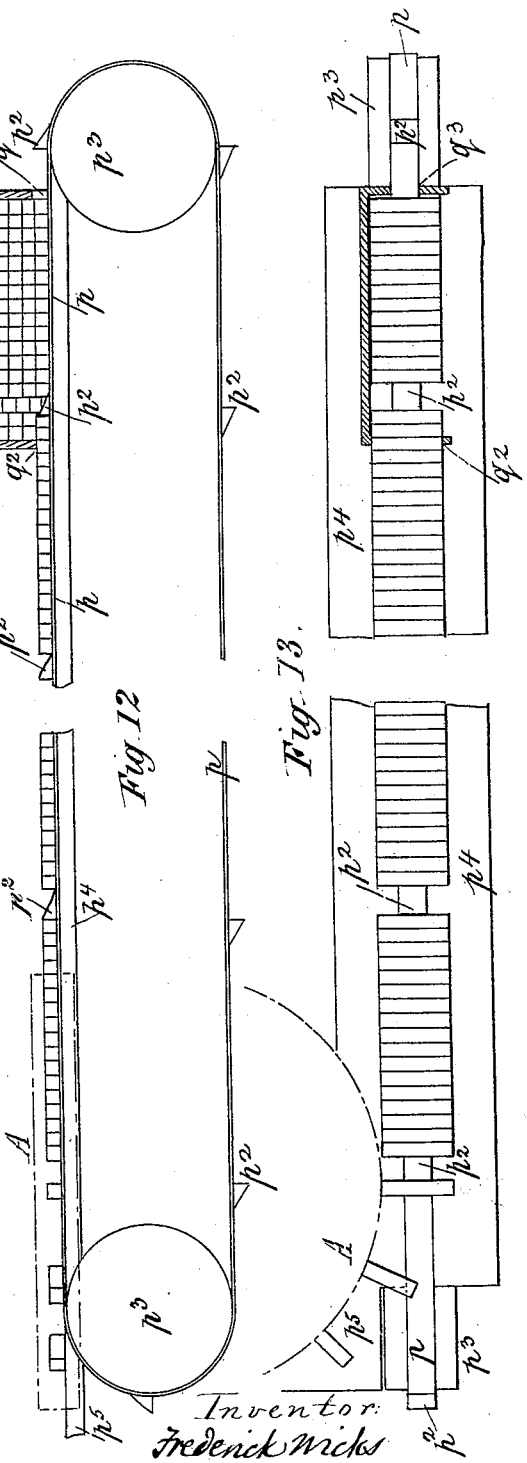
Witnesses
E. A. Dick
P. B. Doing
Inventor
Frederick Wicks
by M. Bailey
his attorney (No Model.) 6 Sheets—Sheet 5.
F. WICKS.
TYPE MAKING AND ARRANGING MACHINERY.
No. 280,699. Patented July 3, 1883.
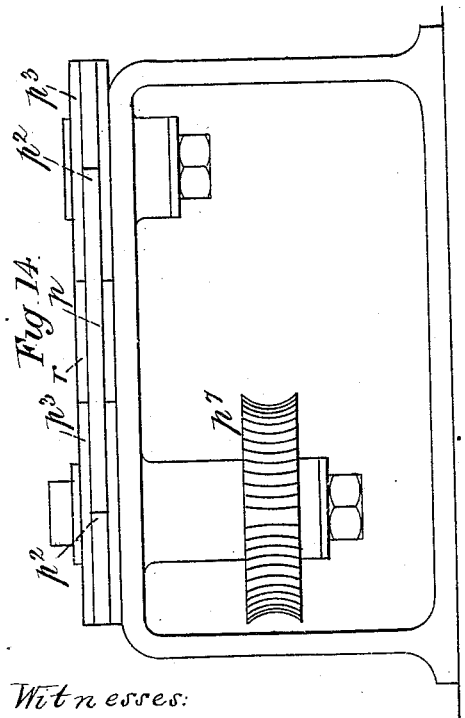
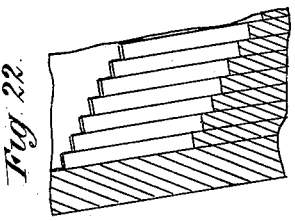
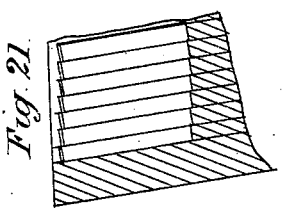
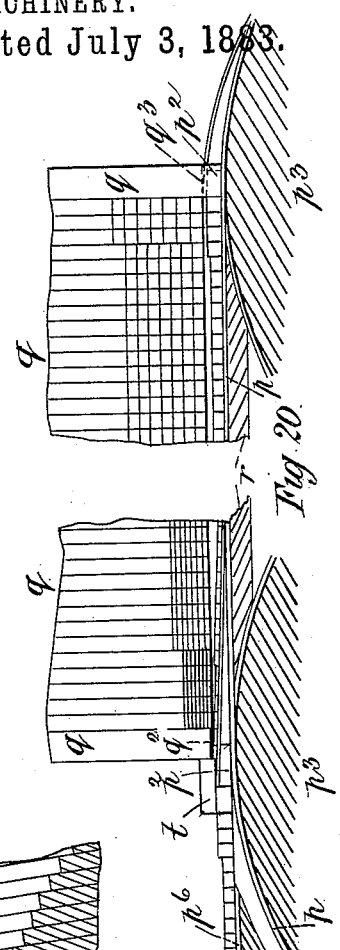
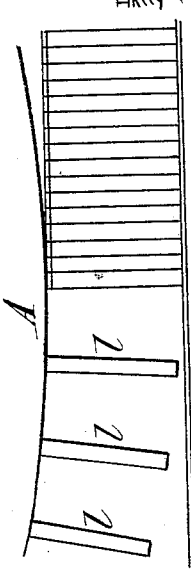
Witnesses:
E. A. Dick
P. P. Doing
Inventor:
Frederick Wicks
by M. Bailey
his attorney (No Model.) 6 Sheets—Sheet 6.
F. WICKS.
TYPE MAKING AND ARRANGING MACHINERY.
No. 280,699. Patented July 3, 1883.
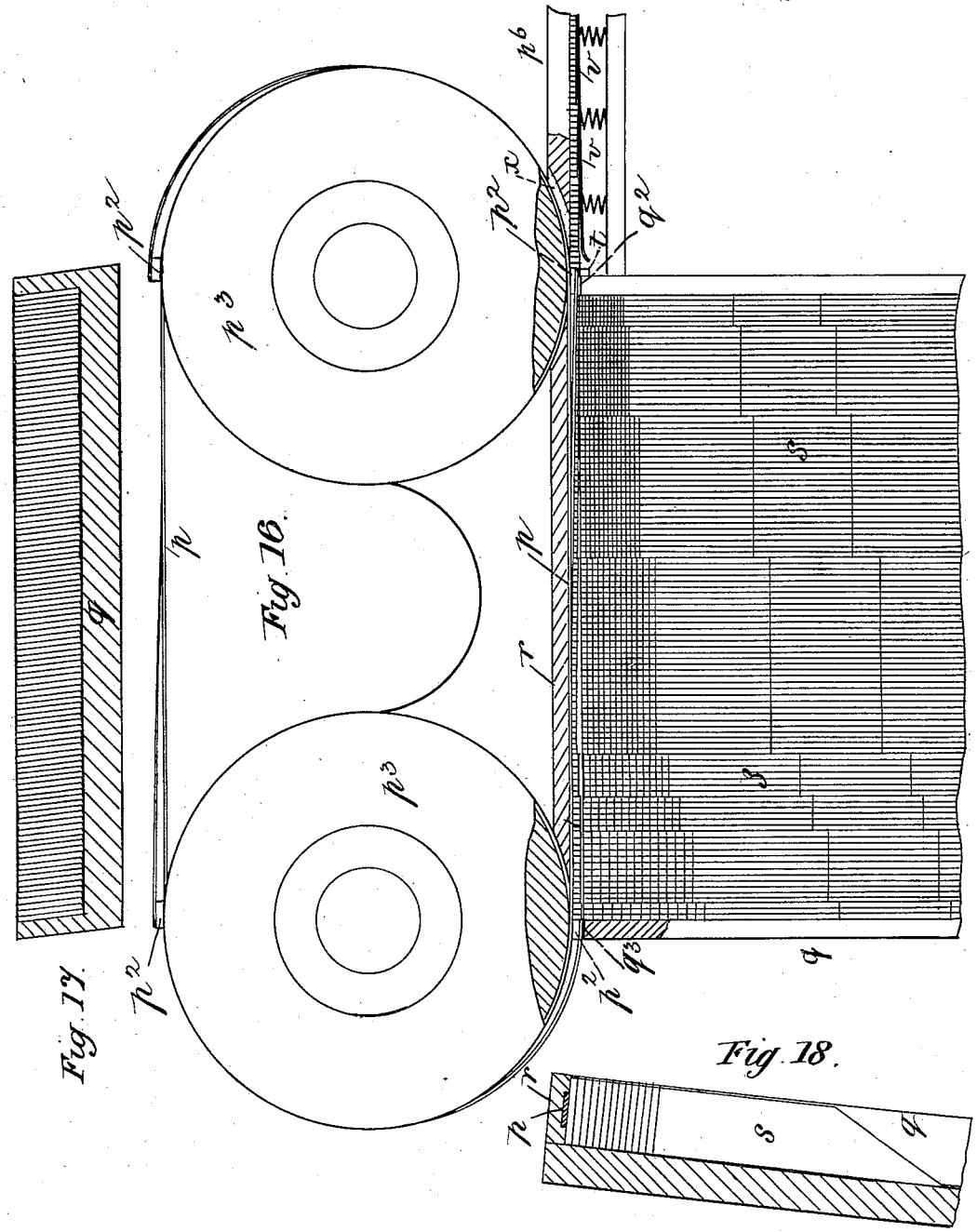

UNITED STATES PATENT OFFICE.

FREDERICK WICKS, OF GLASGOW, COUNTY OF LANARK, SCOTLAND.

TYPE MAKING AND ARRANGING MACHINERY.

SPECIFICATION forming part of Letters Patent No. 280,699, dated July 3, 1883.

Application filed December 20, 1881. (No model.) Patented in England April 4, 1881, No. 1,462; in Belgium October 22, 1881, No. 56,042; in Germany October 27, 1881, No. 18,022, and in France November 8, 1881, No. 145,723.

*To all whom it may concern:*

Be it known that I, FREDERICK WICKS, of Glasgow, in the county of Lanark, Scotland, have invented New or Improved Machinery or Apparatus for Manufacturing and Arranging Types for Printing Purposes, (for which I have received Letters Patent in England, No. 1,462, dated April 4, 1881,) of which the following is a specification.

My invention relates to new or improved machinery or apparatus for manufacturing types for printing purposes, and has for its object to cast or form the said types with great rapidity and facility, and also, if desired, to arrange them in their proper order, according to their kinds, for use in composing-machines, or for otherwise being composed or "set up."

According to my said invention a series of molds (in number according to the number of kinds of types to be made) is arranged so that the orifices of the molds are presented in rapid succession before the outlet from a reservoir of molten type-metal, the said molten metal being caused to pass into the molds as they pass therebefore. The said metal may be caused to pass into the said molds by creating a vacuum therein, which may be effected by forming on or connecting to a plunger or slider fitting and sliding in each mold a projection, which comes into contact with a cam-surface just before the plunger or slider and the mold with which it is in connection pass before the reservoir of molten metal, so that the said plunger or slider, which formerly occupied the mold, is withdrawn therefrom to allow the said metal to run into the mold. There is a pump or equivalent arrangement for injecting or pressing the metal into the molds. Arrangements are made for cooling (such as by water-boxes) the types in the series of molds, and dressing-knives or their equivalents may be combined to trim the ends of the cast metal, to nick the types, and otherwise to finish them. Mechanism is provided for ejecting the letters and preparing the molds for new casts. This may be effected by means of a cam-surface acting in the reverse manner from that previously described, so as to move up the plungers or sliders and eject the types. The plungers or sliders hereinbefore described as sliding or moving backward in the molds, to allow them to receive the molten metal and forward to eject the types, may have the dies or counterparts of the letters or signs (which are to be cast or formed upon the respective types) upon their ends, which form the bottoms or inner ends of the molds; or, in place of this, there may be a disk or wheel with a number of dies or counterparts of the types to be formed on its periphery, so that the metal cast in the molds will be afterward stamped or formed with the proper letters or signs by these dies or counterparts. Mechanism is provided consisting of a wheel or band for receiving the said types and passing them forward, so that letters or signs of the same kind are brought into line or one upon or behind the other. The molds and matrices or dies or counterparts may be so arranged that the series of molds around the disk or wheel will correspond with a complete font, and thus at each rotation of the wheel or disk each line of types so made at each such rotation is successively received upon the wheel or band, and the lines then raised or moved forward, so that the next succeeding line is placed thereunder or at the back thereof by the action of the last-mentioned wheel or band, and all types of the same kind will thus be arranged altogether in line.

In the drawings, Figure 1 represents in elevation, partly in section, and Fig. 2 in plan, the general arrangement of a machine constructed according to my invention. Figs 3 to 9 represent the wheel or series of molds wherein the casting of the types is effected and details thereof. The other figures are details and diagrams of various parts and modifications, as hereinafter described.

The wheel or disk A has in it a series of molds, $a$, in number corresponding to the number of kinds of type to be made, the said molds radiating from the center of the said wheel A. The said molds may be formed in the said wheel or disk in any suitable or convenient manner. As shown in the drawings, they are formed by means of plates $a^2$, set apart from each other, so as to leave a space between them of a width equal to the length from top to bottom of the particular kind of letters and signs to be formed. The thickness of the plates is in accordance with the width or breadth from side to side of the particular letter or sign to be cast in the space between two adjacent plates. Fig. 9 represents the periphery of one-half of the wheel A, showing variations in the molds there illustrated in accordance with the various breadths of types to be produced in the said molds. A ring, $a^3$, covers the plates $a^2$ and forms the upper part of the spaces or molds $a$. The matrices by which the types are formed are upon the ends of sliders or plungers $b$, fitting accurately, and capable of sliding in the said molds $a$. The said plungers $b$ are formed with or have attached thereto projections or blocks $b^2$. Fig. 4 represents in side elevation, Fig. 5 in end elevation, and Fig. 6 in plan one of these sliders or plungers for a thin type, and Figs. 7 and 8 are a similar side and end elevation of a slider or plunger for a thick type. In the end elevations Figs. 5 and 8, parts of the wheel A and plates $a^2$ are drawn in section to show the molds in which the said sliders or plungers work, the ring $a^3$, forming the top of the mold, being omitted from Figs. 5 and 8. The said wheel or disk A is mounted upon a fixed axial pin or carrier, $c$, there being fixed to the said wheel or disk a worm-wheel, $d$, (see Fig. 1,) gearing with a worm, $e$, upon a shaft E, receiving motion of revolution from any convenient motor. Upon the axial pin $c$ is mounted a fixed non-rotating piece, $f$, carrying two cams or eccentric pieces $f^2$ and $f^3$, the cam $f^2$ being in the path of the hinder or inner ends of the blocks $b^2$, and the cam $f^3$ being in the path of the forward or outer ends of the said blocks $b^2$. These cams are shown in Fig. 3 in the position which they occupy. The pot G, containing the molten metal, is situated near to the wheel A, and its outlet consists of a piece, $g$. (Shown separately in horizontal and vertical longitudinal sections, respectively in Figs. 10 and 11, the latter figure showing also a part of the wheel A.) The outlet end of this piece $g$ is in contact with the periphery of the wheel A, as shown in Figs. 3 and 11, so that when the said wheel revolves the openings of the molds are successively presented before the said outlet. The metal is kept in a molten condition in the pot G by any suitable method of heating—as, for example, by burning a mixture of gas and air beneath it, and the said molten metal is pumped by the double-acting pump $G^2$ into the channel $g^2$ of the piece $g$, and thence into the molds from the exit-opening at $g^3$, which is preferably contracted to form a long narrow slit, as shown in Fig. 11, and has a narrow projecting margin to bear upon the wheel A. The quantity of metal thus pumped into the channel $g^2$ is greater than is requisite to fill the molds, and the surplus metal will consequently pass back into the pot by the return-channel $g^4$ and pipe $g^5$. Thus a constant circulation of molten metal is kept up before the periphery of the wheel A. Any suitable pump or forcing apparatus may be employed. In that illustrated the plungers $g^6$ are valves alternately opening inlet and outlet passages to and from the pump, the said passages being marked $g^7$ and $g^8$, respectively. The plungers of the pump are marked $g^9$, both they and the valves $g^6$ being driven by cams on the shafts $h$, which may receive their motion through toothed gearing from the shaft E. The outlet-piece $g$ is inserted in a recess in the bottom of the pot G, through which passages are formed respectively, opening communication between the outlet $g^8$ from the pump and the passage $g^2$, and between the passage $g^4$ and the pipe $g^5$. A weighted lever, as at $k$, may be employed to press upon the back of the projecting sides $G^3$ (see Fig. 3) of the fore part of the piece $g$, to keep it in close contact with the periphery of the wheel A. A knife, $i$, is provided in contact with the periphery of the wheel A to trim or cut the types as they pass therebefore. The series of molds $a$ may be arranged in other ways, if desired, than horizontally, as described. The wheel A may, for instance, revolve on a horizontal axis, the molds being placed parallel thereto on or near to the periphery of the wheel.

When the machine is in action, motion of rotation being given to the wheel A, the mouths of the molds $a$ are presented in succession before the outlet $g^3$ for the molten metal from the pot G. The cam $f^3$, by reason of the blocks $b^2$ bearing against it, causes the plungers $b$ to be withdrawn as the molds pass before the said outlet, so that a vacuum is formed in the molds, into which the molten metal passes and receives the forms of the desired letters or signs from the matrices on the plungers. When the blocks $b^2$ come opposite the cam $f^2$, the plungers $b$ are forced outward and expel the types.

Fig. 19 is a diagram showing a portion of the edge of the wheel A and the types $l$ being received upon a receiving gallery or table, $p^6$. The wheel A may be kept hot by a flame of gas and air or by other means so situated that the periphery of the wheel is heated thereby just before it passes before the outlet $g^3$. A water-casing, $n$, or equivalent cooling device may be situated, as shown in Fig. 2, so that the periphery of the wheel is cooled just after it leaves the said outlet $g^3$. The types received upon the gallery or table $p^6$ (omitted from Fig. 1) are taken by any suitable means to their receptacles, or they may be arranged in their proper order, according to my invention, by the following means, which I will describe with reference to the diagrams Figs. 12 and 13, which respectively represent an elevation and plan of the arrangement, the types there represented being of large size, few in number, and all of the same size in order to render the delineation more simple and the better understood. The types are projected by the plungers $b$ toward a traveling endless band, $p$, provided with a number of wedge-shaped projections, $p^2$, situated at a distance apart equal to or slightly greater than the space occupied by a complete series of types issued during one revolution of the wheel. The band $p$ will travel at such a rate that a projection will pass over a distance equal to the length of band between two projections during one revolution of the wheel of molds, so that a projection will come opposite the first type of the series delivered from the said wheel, and the same letters will therefore occupy the same relative positions upon the band $p$ between any two projections. The band $p$ is carried past a galley or receiver, $q$, of a width equal to the space occupied by the series of types issued by the wheel during each revolution, the said band $p$ passing through slits $q^2$ $q^3$ in the sides of the said galley or receiver. The slot $q^2$, in the side whereat the types enter, is of sufficient length to admit the types upon the band $p$; but the slit $q^3$, at the farther side, is only of sufficient length to allow the passing of the band $p$ and its projections $p^2$, and consequently each series of types carried between each projection $p^2$ of the band $p$ is stopped by the said farther side, and the next succeeding projection raises this series of types and any other series which may have been received in the galley, and makes room for the next series carried between this last-mentioned projection and the next one, and so on. The types, it will thus be evident, are eventually arranged in lines, the individual types of each line being alike. The band $p$ is mounted upon and caused to travel by the grooved pulleys $p^3$, the said band and pulleys being formed with recesses and projections to engage together. The band is supported between the pulleys by a table, $p^4$, which may have an extension at $p^5$, partly encircling the wheel A to insure the proper reception of the types.

If it be desirable to arrange the types with their faces upward in a horizontal or approximately horizontal galley in place of in vertical lines, this may be effected by mounting the band $p$ upon pulleys or rollers so situated that the band is in a horizontal position at the wheel A, and gradually assumes a vertical or approximately vertical position at the other end a ledge to support the types being formed on the plate sustaining the band; or the same object may be effected by placing between the wheel of molds and the receiving galley or table a stationary receiving-strip or carrying-guide, $p^6$, Fig. 2, which is bent gradually into a vertical or nearly vertical position, and the band $p$, with the projections $p^2$ therein, will be arranged to travel at the end of this strip or guide and before the entrance end of a receptacle or galley, $q$, for the types, set in a horizontal or slightly-inclined position.

Fig. 14 represents in elevation, Fig. 15 in elevation at right angles thereto, and Fig. 16 in plan, drawn to a larger scale, this arrangement of the band $p$ and galley $q$. The galley $q$ is shown set at a slight angle inclining downward from the receiving end. The projections $p^2$ on the band $p$ are formed so that there is a gentle inclination or gradual rise from the band to the apex of each projection. The said band $p$ is endless and is carried in grooves in the peripheries of the revolving pulleys or wheels $p^3$ $p^3$, the said wheels and band being furnished with projections and recesses to engage together, so as to cause the band to travel with the wheels. A grooved guide-piece, $r$, receives and supports the band $p$ between the wheels $p^3$. The types are delivered from the molds upon the strip or guide $p^6$, and are moved forward by successive types as they are carried by and are being delivered from the wheel A until they arrive at the band $p$, there being a slot or nick, $x$, Fig. 16, in the end of the said strip $p^6$, to allow of the passage of the band and its projections. After arriving at the band the types are held against the same by a spring-pressed plate, V, to insure the carriage of the type by the band. The band $p$, the strip or guide $p^6$, and the wheel A are so relatively arranged, and the speeds of the said wheel and band are so regulated, the one to the other, that each series of types delivered from the wheel at each revolution is eventually received upon the band between two projections thereof, and is drawn forward by the band essentially as hereinbefore described with regard to the other arrangement, Figs. 12 and 13.

Figs. 19 and 20 are respectively diagrams, showing in plan, drawn to a larger scale, a portion of the one end of the strip or guide $p^6$, which receives the types from the wheel A, and of a portion of the other end of the said strip and portions of both sides of the galley $q$, into which the types are received, the said Fig. 20 also showing the band $p$ traveling at the upper end of the said galley $q$. A series of types is shown upon the said band $p$, between the projections $p^2$ $p^2$, which series is just about to be stopped by the side of the galley at $q^3$ from traveling with the said band, the projections $p^3$ passing through the opening $q^3$ in the said side, not large enough to allow the types to pass. As the band travels onward, therefore, the said series of types and those which preceded them will be pushed forward along the galley $q$ by the next projection $p^2$, and so on during the operation of the machine. The galley $q$ is shown in transverse section at Fig. 17, and is preferably grooved, as shown more clearly in the transverse section of a portion of the said galley drawn to a larger scale in Fig. 21, the said grooves forming step-like guides inclining toward one side of the galley, one guide for each kind of type. To facilitate the removal or manipulation of the lines of types these guides may become deeper as they descend, as shown in Fig. 22, which is a section some little distance down the galley, and in Fig. 23, which is a section still farther down the galley. The said guides may also increase in width as they descend if it be desired that the lines of types be separated laterally. To support the types sliding weights $s$ may be placed in the galley to support the first types of the lines, as shown in Fig. 16, and also in Fig. 18, which is a longitudinal section of the part of the galley shown.

In the hereinbefore-described arrangement the letters or signs of the types are impressed upon the inner ends of the castings by matrices or dies upon the ends of the plungers $b$; but it will be evident that they may be impressed upon the other or outer ends of the castings while they are yet in the molds by forming the said matrices or dies upon a wheel corresponding to the wheel A, so that the matrices each come opposite one of the molds $a$ when the wheels are rotated. The matrix-wheel is so mounted that the peripheries of the wheels are in contact at a part of the periphery of the wheel A after it has passed the outlet $g^3$ from the melting-pot, and before the cam $f^2$ begins to act to eject the type, the said matrices stamping or impressing upon the ends of the castings in the molds the requisite letters or signs. The wheels will of course be arranged with the requisite pressure between them to give the necessary force for so impressing the said matrices into the metal, and a stop (which may be a continuous ring) will be placed at the back of the series of projections $b^2$ to restrain the inward motion of the plungers and give the requisite support against the pressure of the said matrices. Where the matrices are upon the plungers $b$ this inner restraining-ring may be used with advantage, and may be arranged so that the types are cast slightly longer than the correct length, the knife $i$ cutting off the ends when they have been ejected to a degree corresponding to their excess of length, so that the types are of the proper length when received upon the band or guide.

In Fig. 3 the series of molds do not extend completely around the wheel A. The vacant space during the revolution of the wheel will synchronize with the projections $p^2$, and it may in part be occupied by a "large quad" mold. The "quads" cast therein will eventually be received upon the projections $p^2$, and, being unable to pass through the slot at $q^2$ into the galley $q$, (through which the types enter,) owing to that slot being obstructed by the said projections, the said quads will be dislodged into any suitable receptacle. A quad upon a projection, $p^2$, and about to be so dislodged, is shown at $t$ in Figs. 16 and 20.

The apparatus for arranging the types shown in the general elevation and plan, Figs. 1 and 2, is like that described with reference to Figs. 14 to 23. The pulleys or wheels $p^3$ in this arrangement are shown as being driven by a worm upon the shaft E gearing with the worm-wheel $p^4$ upon the axis of one of the said wheels $p^3$. The worm referred to, being a well-known instrumentality, is not represented in Fig. 2, in order to avoid obscuring more material parts of the machine. One of the pulleys or wheels in the arrangement, Figs. 12 and 13, may be driven in a similar way. To retain the type upon the guide $p^6$ in position a strip or strips, as at $v$ in Fig. 16, may be employed at any portion or portions thereof, to be pressed upon the types by springs.

I claim—

1. In a type-making machine, the combination of a metal-reservoir having a discharge-nozzle adapted to fit the periphery of a wheel and connected with a supply and a return passage, with a wheel bearing molds, substantially as specified.

2. In a type-making machine, a wheel having a series of molds arranged peripherally therein, and a series of plungers bearing matrices, and adapted to exhaust the air from the molds, in combination with a metal-reservoir having supply and return passages connected with a discharge-opening, adapted to fit the periphery of the wheel.

3. The apparatus for pumping the molten metal into the molds—that is to say, an apparatus wherein a constant circulation of the molten metal is maintained in or through the outlet-orifice $g^3$, in front of the series of molds $a$—essentially as hereinbefore described, and illustrated in Figs. 1, 2, 10, and 11 of the accompanying drawings.

4. In a type-making machine, a metal-reservoir having supply and return passages merging in a discharge-orifice, and provided with means, substantially as specified, for maintaining a circulation of molten metal therein, substantially as shown and described.

5. In a type-making machine, a metal-reservoir having supply and return passages merging in a discharge-orifice, and provided with a pump for maintaining a circulation of molten metal therein, substantially as specified.

6. In a type-making machine, the combination, with a metal-reservoir having a supply-passage, a return-passage, and a discharge-orifice communicating with each, of a wheel provided with molds arranged to register with said discharge-orifice.

7. In a type-making machine, a discharge nozzle or orifice communicating with supply and return passages, in combination with a wheel provided with a series of molds arranged and operating to simultaneously and gradually be filled from said orifice, substantially as specified.

8. In a type-making machine, a wheel having a series of molds extending less than the entire circumference of said wheel, in combination with a belt or carrier having projections adapted and arranged to project between the types delivered at the terminal molds of the series, substantially as specified.

In testimony whereof I have signed my name to this specification in the presence of two subscribing witnesses.

FREDERICK WICKS. [L. S.]

Witnesses:
ROBERT ADAM GUNN,
JAMES CUTHBERT,
*Both of* 115 *St. Vincent Street, Glasgow.*